(12) United States Patent
Chakra et al.

(10) Patent No.: US 7,912,901 B2
(45) Date of Patent: Mar. 22, 2011

(54) AUTOMATING APPLICATION STATE OF A SET OF COMPUTING DEVICES RESPONSIVE TO SCHEDULED EVENTS BASED ON HISTORICAL DATA

(75) Inventors: Al Chakra, Apex, NC (US); Siddharth P. Desai, Raleigh, NC (US); Zachary J. H. Marlow, Raleigh, NC (US); Tejaswini R. Patil, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 12/190,387

(22) Filed: Aug. 12, 2008

(65) Prior Publication Data

US 2010/0042704 A1 Feb. 18, 2010

(51) Int. Cl.
*G06F 15/16* (2006.01)
*G06F 15/177* (2006.01)

(52) U.S. Cl. ............... 709/204; 709/221; 709/228

(58) Field of Classification Search .............. 709/204, 709/221, 227, 228; 370/261; 715/753
See application file for complete search history.

(56) References Cited

U.S. PATENT DOCUMENTS

| 5,223,827 | A | * | 6/1993 | Bell et al. ............... 714/704 |
| 5,680,617 | A | | 10/1997 | Gough et al. |
| 5,842,009 | A | * | 11/1998 | Borovoy et al. ............... 1/1 |
| 5,922,071 | A | | 7/1999 | Taylor et al. |
| 6,134,532 | A | | 10/2000 | Lazarus et al. |
| 6,340,977 | B1 | | 1/2002 | Lui et al. |
| 6,363,352 | B1 | * | 3/2002 | Dailey et al. ............... 705/9 |
| 7,679,518 | B1 | * | 3/2010 | Pabla et al. ............... 340/573.1 |
| 2009/0006608 | A1 | * | 1/2009 | Gupta et al. ............... 709/224 |
| 2009/0049520 | A1 | * | 2/2009 | Kubota ............... 726/3 |
| 2009/0165022 | A1 | * | 6/2009 | Madsen et al. ............... 719/318 |

* cited by examiner

*Primary Examiner* — Larry Donaghue
*Assistant Examiner* — Brian J Gillis
(74) *Attorney, Agent, or Firm* — Patents on Demand, P.A.; Brian K. Buchheit; Scott M. Garrett (57) ABSTRACT

A programmatic event related to a meeting can be detected. At least one previous meeting similar to the meeting can be determined. A pattern relating to an application state of a set of at least one computing devices can be ascertained for at least one previous meeting. A difference between a current application state of the set of computing devices and an application state indicated by the ascertained pattern can be determined. The current application state of the set of computing devices can be automatically adjusted to lessen the determined difference.

19 Claims, 4 Drawing Sheets

Meeting Type Interface 305

Meeting Types:
- Sales – Phone w/ Recipients A
- Support – Net-meeting 310
- Sales - Teleconference Title: [Support – Net-meeting] 315

☐ This meeting type requires certain participants: 320

[Add from Address book] 325

J Smith 330

☐ The meeting title must match this regular expression: [m/Company A/] 340
335

☐ The meeting must take place between [8:00AM ▼] and [9:00AM ▼]
345  350

☑ The meeting must employ these mediums: 355
☐ Phone  ☑ Net Conference  360
☐ IM     ☐ E-mail

[Save Changes]

AUTOMATING APPLICATION STATE OF A SET OF COMPUTING DEVICES RESPONSIVE TO SCHEDULED EVENTS BASED ON HISTORICAL DATA

BACKGROUND OF THE INVENTION

The present invention relates to the field of calendaring software, more particularly to automating application state of a set (one or more) of computing devices responsive to scheduled events, where the adjusted application state is based at least in part upon historic data.

Digital calendars can help a user organize their schedule in many ways. For some business people, digital calendars have become an important part of their business routine. These users can use their calendars to set appointments and allocate time for different meetings and events. When a scheduled meeting or event is going to take place soon, the calendar can alert its owner in any number of ways. Some calendar systems can update a display device, use an audible alarm, and send the owner an email or simple messaging system (SMS) message. Some meetings or events are recurring and always happen at the same time and/or day. For each of these meetings, the user can have a set of required actions to perform to prepare for the meeting. For example, a user may have to initiate an internet-based conference with certain recipients, open certain documents for viewing, connect to an application server, or the like.

Every time a user has to switch to a different meeting or event, they must prepare for it. Part of this preparation can include loading suitable content and applications upon a computing device used during meeting interactions. For example, often one or more meeting participants use a tele-presence option, which requires communication software to be loaded and configured to enable the user to participate in the meeting. In another example, a meeting participant can take notes upon a notebook computer during a meeting using a note taking application of their choice. Further, users can load a slide show in a presentation application, can access meeting related documents, and perform other computing actions in preparation of a meeting. Users can also want to review previous meeting minutes, view past electronic presentations, and take other action in advance of a meeting in preparation for it.

Adjusting application state (changing a current desktop environment) to suit a meeting related state can be a time consuming endeavor. This is especially true for applications requiring configuration settings, which must be looked for that meeting. For example, conference calls generally require an special number to be dialed, a passcode to be input, and a participant enter some level of setup data (providing a name and other personal information) before a participant is granted access to a phone conference session. As use of meeting facilitating tools has increased (e.g., slideshow programs, Web-based collaboration programs, meeting applications, file exchange programs, etc.) pre-meeting setup time has also increased in a corresponding fashion.

DETAILED DESCRIPTION OF THE INVENTION

The present invention provide a meeting-centric solution designed to reduce an amount of time a user spends manually preparing an application state of a set of computing devices in preparation for a meeting or other scheduled event. The solution can monitor an application state of one of more computing device associated with a user and can correlates patterns in this application state with meeting times. That is, the invention detects when a user consistently adjusts their computing device(s) in a fixed way in preparation for a meeting of a given type. Based upon this pattern, the invention can automatically adjust the application state of the computing device(s) in preparation for a meeting. Different meeting types can be associated with different application state patterns. Further, a user can explicitly configure their computing device(s) to behave in a user specified manner in anticipation of a meeting occurrence. In one embodiment, the system can include a learning algorithm so that a prediction of a user's desired application state for one or more computing devices for a given meeting type improves over time and/or adjusts as a user's pre-meeting behavior adjusts. Adjustments to application state can include instantiating applications, loading content into one or more applications, and/or performing other programmatic actions (such as automatically executing a macro, script, or other set of one or more programmatic actions to dictate behavior of one or more computing devices).

In one embodiment, user profiles can be shared across different environments, so that user-specific pre-meeting adjustments can be made in a consistent fashion even when a meeting user situationally utilizes a different set of computing devices. For example, a home office system can adjust application state in a consistent manner as an in-office system would adjust based upon user profile. In another embodiment, meeting preparation data can be among different users, to prompt a user of a setting or set of settings that other similarity positioned users have found to be beneficial. In still another embodiment, one or more of the meeting participants (e.g., a meeting chairperson or presenter) can be selectively granted control to adjust an application state of a set of computing devices used by meeting participants. For example, a presenter can cause participant computing devices to instantiate a presentation application and to load a presentation instance. In another example, a meeting establisher can record conferencing data in a meeting entry, which is used by participant devices configured to automatically initiate a conferencing session based upon the conferencing data to help minimize participant pre-meeting time expenditures.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
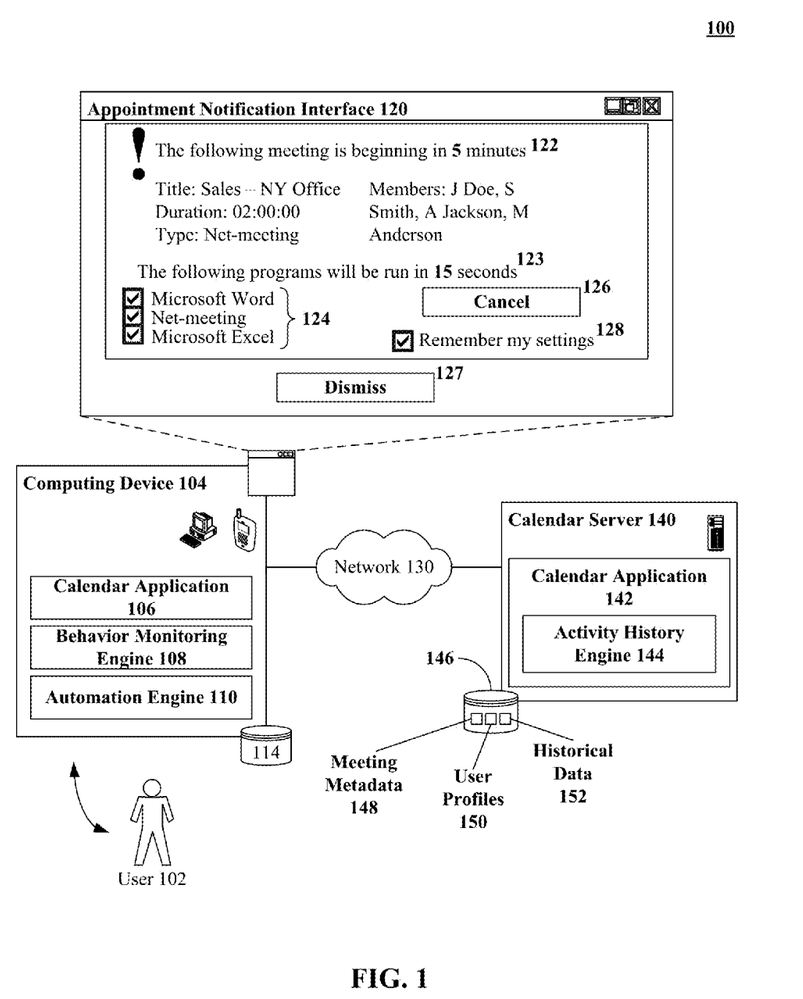
FIG. 1 is a schematic diagram of a system for automating user actions during scheduled events based on historical data in accordance with an embodiment of the inventive arrangements disclosed herein.

FIG. 1 is a schematic diagram of a system 100 for automating user actions during scheduled events based on historical data in accordance with an embodiment of the inventive arrangements disclosed herein. System 100 can be a system in which user 102 can use computing device 104 to interact with calendar application 142 hosted on calendar server 140 via network 130. Calendar application 142 can store and maintain user 102 specific calendar entries. A client-side application 106 can optionally be used to interact with server application 142. System 100 can use an automation engine 110 to automatically change application state of the computing device 104 (e.g., applications executing upon an Operating System (OS) of device 104, content loaded in instantiated applications, settings applied to active application instances, etc.) based upon occurrences related to meeting events maintained by the calendaring application 142. Programmatic changes to dynamically alter an application state of device 104 can be data driven programmatic events based upon historical data 152, metadata 148 associated with specific meeting events, user specific settings (e.g., stored in user profile 150), explicitly established state changes designated for a meeting related event, and/or other such factors.

In one embodiment, usage patterns can be discerned from historical behavioral data 152 relating to user 102. That is, a user 102 can exhibit behavior affecting an application state before a meeting of a designated type. For example, before a video conferencing meeting, a user 102 can instantiate a virtual meeting application. Once consistent behavior is detected after a configurable number of times, a user 102 desired pattern can be established for that meeting type, which causes the pattern specified programmatic actions to be automatically enabled a next time a meeting of that type occurs.

Behavior monitoring engine 108 can be used to detect behavior, which is stored in a user/device associated manner as historical data 152. Behavior can refer to any set of user interactions (e.g., opening/closing applications, loading documents, re-arranging a desktop, establishing a communication session using a real-time communication application, etc.), which result in changes to an application state (e.g., user 102 experienced computing environment). Activity history engine 144 can discern patterns in the historical data 152 and establish programmatic actions to be taken when occurrences of a meeting event associated with a pattern are detected. The automation engine 110 can cause the computing device to execute actions to alter application state triggered by engine 144 issued messages/events.

In one embodiment, notifications, such as shown in interface 120, can be triggered before an application state change occurs. The interface 120 can prompt a user about a meeting-related event occurrence (as shown by item 122) and prompt a user 102 that a previously configured set of automated actions (124) will occur within a specified time (shown by text 123), unless a user 102 elects to cancel 126 the automated action. In one embodiment, these notifications can be enabled or suppressed based upon user configurable settings. A user 102 can choose to have settings remembered 128, to disable pop-up notifications, to dismiss 127 the interface 122 without taking automated actions 124, and the like. Available options, notification mechanisms, interface layout specifics, and the like can vary from implementation to implementation of system 100.

As illustrated, system 100 uses a client-server configuration where application-state modifying responsibilities are performed in part upon a client computing device 104 and in part upon a server 140. This configuration can be used for computing environments where calendaring events are maintained by a server 140. Storing a user profile 150 in a server side data store 146 can permit similar actions to be taken responsive to meeting events regardless of a client device 104 currently being utilized by user 102.

For example, the computing device 104 used by user 102 can vary based upon meeting specifics (stored in metadata 148), such as user 102 location or meeting location. For instance, if a user 102 is video teleconferencing into a meeting from a home location, the application state affected can be a home personal computer; if from work—a work computer; and the like. In another instance, a set of conference rooms can each include participant usable computing spaces (e.g., a meeting computer used for presentations/note taking, a surface based computer also functioning as a conference table, etc.), which can have their application spaces dynamically adjusted in a user specific manner based upon user profiles 150. Different devices 104 can have slightly different application resources for performing equivalent tasks, which can be mapped to one another so that an application state can be changed appropriately even when resident applications of a device 104 vary. In another embodiment, automatically applied actions that change application state can be shared among a set of different users 102 utilizing different computing devices. For example, automated settings affecting an application state of a meeting leader can be optionally shared by meeting participants so that a set of "shared" application state changes occur to change application state of different computing devices in a synchronized/similar fashion during a course of a meeting.

Other configurations for system 100 are contemplated and the invention is not to be limited by functionality placements shown in FIG. 1. For example, in one embodiment, client device 104 can locally execute a standalone calendaring application 106, which maintains calendaring events locally (data store 114) which drive application state changes responsive to locally executed programmatic actions. In such an embodiment, historical data 152 can be maintained in data store 114 and engine 144 functionality can be implemented in client-side routines. In another embodiment, a set of Web applications can be served to a client-side browser, where application state changes driven by calendaring events occur within these served applications. In a Web application environment, behavior monitoring 108, application state change automation 110, and other functionality can be implemented within the Web-based application server. In yet another embodiment, a Web service able to interact with calendaring server 140 and device 104 can add programmatic functionality to automatically change an application state of a user 102 utilized computing space based upon calendaring event occurrences.

To elaborate upon components of system 100, activity history engine 144 can be a software engine configured to determine if a scheduled event should be automated, monitored, or neither. If the scheduled event should be monitored, while the event is taking place, behavior monitoring engine 108 can provide activity history engine 144 with data to process and save as historical data 152. If the scheduled event should be automated, automation engine 110 can perform actions user 102 has previously performed during that meeting type. The meeting types defined in user 102's user profile 150 can apply to characteristics of meeting metadata 148 to determine which meetings are of which type. Historical data 152 can be associated with meeting types.

Computing device 104 can be any computing device through which a user interacts that includes a configurable application space. Computing device 104 can be, but is not limited to, a desktop computer, laptop computer, mobile phone, personal data assistant (PDA), and the like.

Meeting metadata 148 can contain characteristics of events or meetings scheduled in a user's calendar. These characteristics can make each event or meeting that is scheduled, unique, and identifiable. Defined meeting types can apply to meeting metadata 148 to establish discreet meeting types in which separate configurations can be applied. Meeting metadata 148 can include any number of different characteristics, including, but not limited to, time, date, location, participants, subject, and the like. Meeting types can be defined that apply to any number of these definable characteristics.

Behavior monitoring engine 108 can be used to monitor user 102's behavior on computing device 104 while a scheduled event or meeting is taking place. Behavior monitoring engine 108 can convey monitored behavior to activity history engine 144. Activity history engine 144 can use the received data to create historical data 152. Behavior monitoring engine 108 can be used to collect the data to allow automation engine 110 to automate user 102's actions during a scheduled meeting or event.

Automation engine 110 can recreate the same actions user 102 has in a previously scheduled meeting or event of the same type. Behavior monitoring engine 108 can first be used to track user 102's actions during the meeting type. Once enough data has been collected to automate actions, automation engine 110 can be enabled. When the same meeting type occurs again, automation engine 110 can automate any number of user's actions. Such actions that can be automated can include, but are not limited to, launching applications, preparing a document for viewing, sending a meeting invite or notification, placing a call, configuring a communication, and the like.

Activity history engine 144 can collect behavior data from behavior monitoring engine 108. Activity history engine 144 can process the data received and use algorithms and measurements to determine habitual actions user 102 performs during scheduled meetings or events. Activity history engine 144 can store the processed data as historical data 152 on data store 146.

Calendar application 142 can allow user 102 to schedule events and meetings in their personal calendar, configure automation and behavior monitoring settings, configure meeting types, and the like. User 102 can define types of meetings based on meeting metadata 148 associated with events or meetings scheduled on their calendar. User 102 can then define behavior monitoring and automation settings depending on the defined meeting type. When that meeting type is occurred, calendar application 142 can determine if the user's behavior should be monitored or automation should be enabled. If the user's behavior should be monitored, calendar application 142 can notify behavior monitoring engine 108 to monitor the user's behavior and for how long. If automation should be enabled, calendar application 142 can convey historical data 152 to automation engine 110 for automation.

Data stores 114 and 146 can be physically implemented within any type of hardware including, but not limited to, a magnetic disk, an optical disk, a semiconductor memory, a digitally encoded plastic memory, a holographic memory, or any other recording medium. The data stores 114 and 146 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Network 130 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 130 can include local components and data pathways necessary for communications to be exchanged among computing device components and between integrated device components and peripheral devices. The network 130 can also include network equipment, such as routers, data lines, hubs, and intermediary servers which together form a packet-based network, such as the Internet or an intranet. The network 130 can further include circuit-based communication components and mobile communication components, such as telephony switches, modems, cellular communication towers, and the like. The network 130 can include line based and/or wireless communication pathways.

Figure 2:
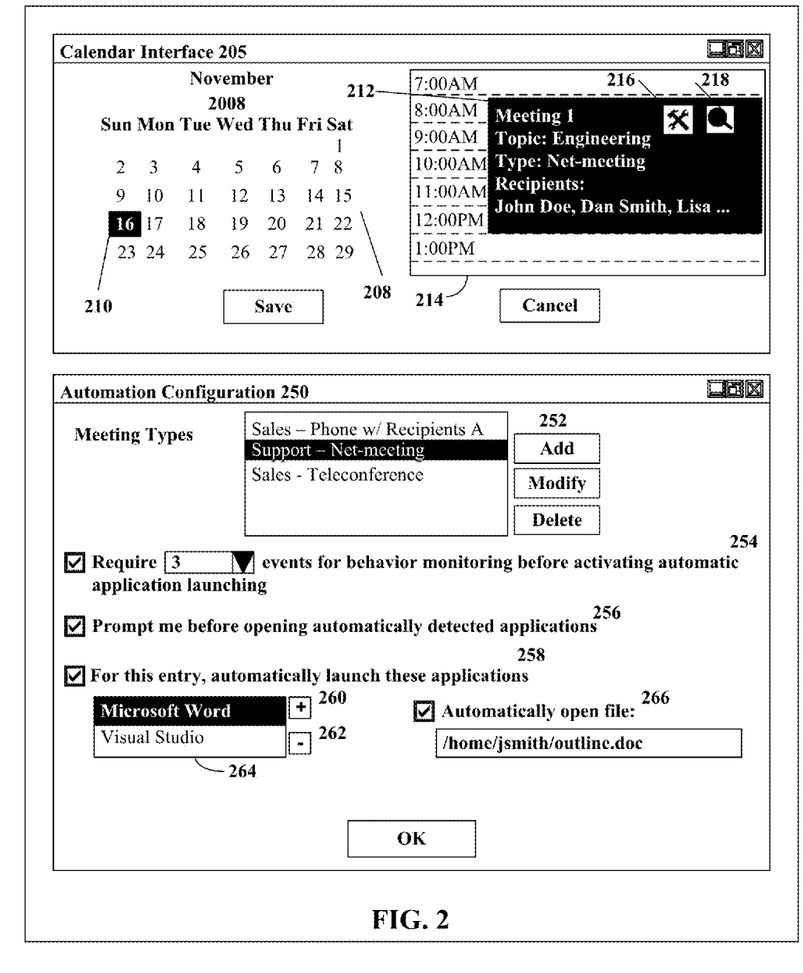
FIG. 2 illustrates interfaces for automating user actions during scheduled events based on historical data in accordance with an embodiment of the inventive arrangements disclosed herein.

FIG. 2 illustrates interfaces 205, 250 for automating user actions during scheduled events based on historical data in accordance with an embodiment of the inventive arrangements disclosed herein. Interfaces 205, 250 can be implemented in context of system 100. The specifics of the interfaces 205, 250 are for illustrative purposes only and are not to be construed as invention limitations. For example, graphical user interface (GUI) controls, options, arrangements, and the like are expected to deviate to reflect design choices and implementation specific choices. Further, although the interfaces 205, 250 are shown as GUIs, other types of interfaces, such as voice user interfaces (VUI), text user interfaces (TUI), multimodal interfaces, and the like are contemplated.

Calendar interface 205 can allow a user to specify meetings on their calendar. View 208 can show a minimal month view of the calendar, allowing the user to select a specific day. In this illustration, selection 210 has been made and Nov. 16, 2008 is selected. View 214 can show an hourly break down of the day and any scheduled events or meetings. View 214 can show meeting 212 scheduled for 8:00 AM to 12:00 PM. This meeting can have associated meeting metadata, which can include characteristics of the meeting. Control 218 can be a button which can allow an expanded view of all the characteristics of the meeting. Control 218 can also allow the modification of these characteristics. Control 218 can expand the view in interface 205 or it can present a new interface to the user for viewing and modification of the meeting characteristics. Control 216 can present the user with an interface for modifying automation and behavior monitoring settings, as shown in automation configuration 250.

Figure 3:
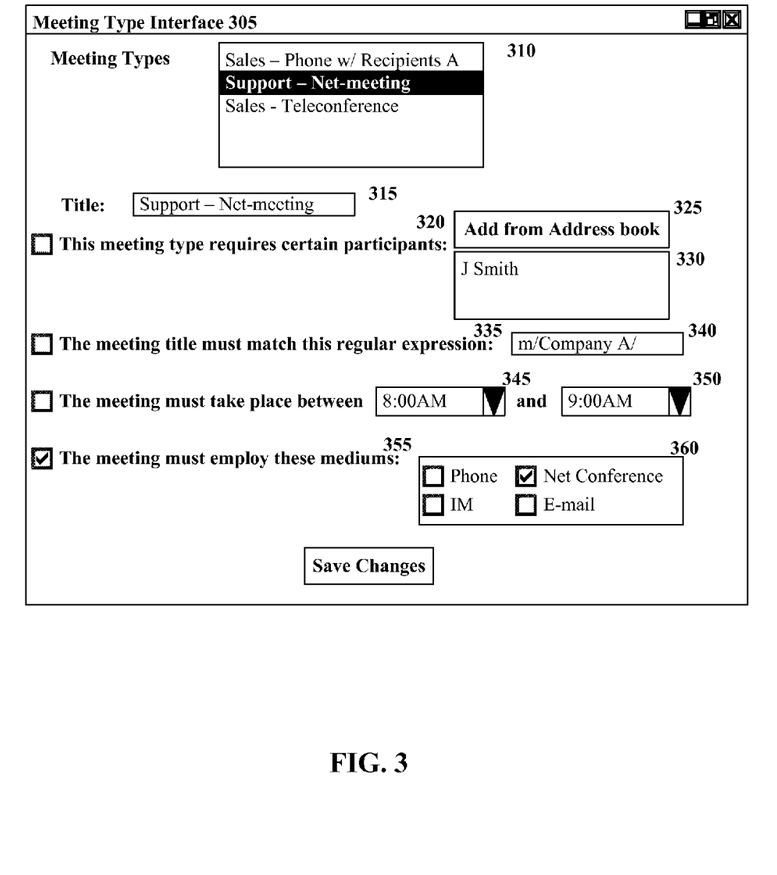
FIG. 3 can include meeting type interface, which can allow a user to specify meeting classifications.

Automation configuration 250 can include list 252, which can include a list of the currently defined meeting types (Add, Modify, Delete). When automation configuration 250 is presented after clicking on a control such as control 216, a meeting type associated with meeting 212 can automatically be selected, but a user can use control 252 to select any meeting type to modify the settings for. Controls, such as Add, Modify, and Delete, can allow the management of the currently defined meeting types. The Add Control can create an interface for specifying settings for a new meeting type, such as interface 305 of system 300. The Modify Control can be used to create a similar interface but to modify the settings of the selected meeting type. The Delete Control can be used to delete defined meeting types. Control 254 can allow the toggling of a required number of monitored events before automation is enabled. The user can use this control to specify the number of monitored events before the automation is enabled.

For example, if a user specifies three monitored events are required before automation is enabled, the first three times the meeting is encountered, the user's behavior will be monitored, in an attempt to automatically detect the user's actions to reproduce them in the future. Control 256 can be used to toggle prompting the user before automating the launching of any applications. This can allow the user to be prompted and select which applications to open before they're opened. Control 258 can allow the toggling of explicitly set applications to launch. List 264 can list the currently explicitly selected applications for automatic launch for the meeting type. Controls 260 and 262 can allow the adding and deleting of applications from list 264. List 264 can also allow the user to select an application in the list, for further specification of a document to open in the application using control 266.

FIG. 3 illustrates an interface 305 for automating user actions during scheduled events based on historical data in accordance with an embodiment of the inventive arrangements disclosed herein. As with FIG. 2, the interface 305 is provided for illustrative purposes only and is not to be construed in a limiting fashion.

FIG. 3 can include meeting type interface 305, which can allow a user to specify meeting classifications. Interface 305 can include a set of options that let a user specify what defines a meeting type. Interface 300 can include list 310, which can be a list of currently specified meeting types. A user can use this control to select a meeting for modification. If no meeting is selected, the user can be specifying content for a new meeting type. Control 315 can allow the user to specify a title for the meeting type. Control 320 can allow the user to toggle whether or not this meeting type is definable by the participating members of the meeting. Controls 325 and 330 can be associated with 320, allowing the user to specify a list of users in which define the meeting type. Controls 335 can allow the toggling that the meeting type is definable by the title matching a regular expression configured in control 340. Controls 345 and 350 can allow the enablement and specification that this meeting is definable by the time it takes place. Controls 355 and 360 can allow the enable and specification that the meeting type is definable by the mediums, or communication protocols it employs. Such communication protocols can include phone, instant messaging (IM), email, and internet conferencing.

In interface 305, the user's selected options define a meeting type. For example, assuming for illustrative purposes that a user has enabled controls 320 and 335. In this case, control 320 can enable the requirement of certain participants. The user can select one required participant, John Smith. The user can also enable control 335, which enables the matching of the meeting title with the regular expression in control 340. The regular expression shown is "m/Company A/" which would enable the matching of "Company A" anywhere in the meeting title. With these specified options, if a meeting is encountered that contains John Smith as a participant, and "Company A" is in the title, it would be considered this meeting type. It is contemplated that interface 305 can provide the user with any level of configurable settings. It is also contemplated that interface 305 can allow logical operations, such as "and" and "or." For example, a user can specify that the meeting type must match control 320 or control 335. That is, the meeting must either contain John Smith as a participant, or have "Company A" in the title.

Figure 4:
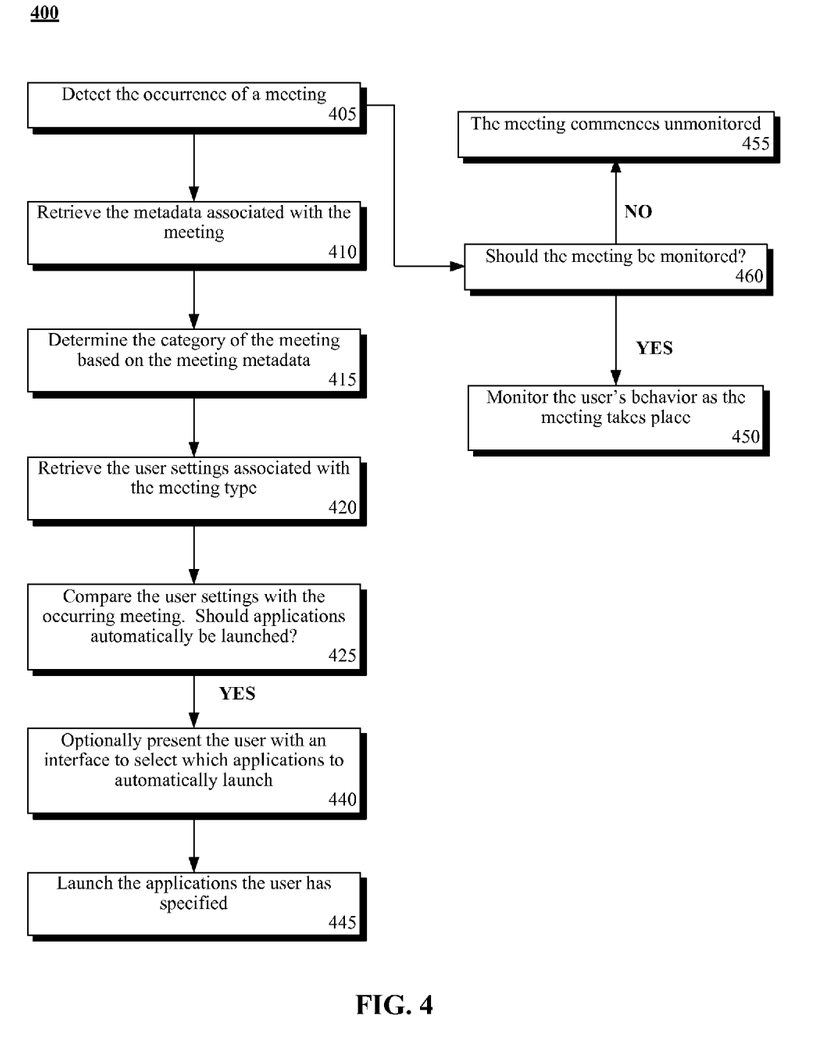
FIG. 4 is a flow chart of a method for automating user actions during scheduled events based on historical data in accordance with an embodiment of the inventive arrangements disclosed herein.

FIG. 4 is a flow chart of a method 400 for automating user actions during scheduled events based on historical data in accordance with an embodiment of the inventive arrangements disclosed herein. Method 400 can be performed in context of system 100.

Method 400 can begin in step 405, where the occurrence associated with a scheduled meeting can be detected. The detected occurrence can be one defined and/or driven by data maintained within a calendaring system. The detection occurrence can be associated with different time periods relative to a meeting specific time event and/or can be associated with meeting completion activities (assuming such activities are monitored and updated during a meeting) For example, a detection of step 405 can occur at any programmatically configured time in advance of a meeting (e.g., 10 minutes before, 30 seconds before, etc.), during a meeting (e.g., three minutes after a meeting starts, after a first two meeting items in an associated meeting agenda are handled, etc.), and/or after a meeting (5 minutes after a meeting, two days after a meeting if an action item of the meeting is not indicated as completed, etc.). Different programmatic actions can be associated with different time periods for a common meeting. For example, an instantiation of a communication action can be triggered immediately before a meeting and an instantiation and loading of a presentation application can occur during a meeting.

In step 410, the metadata associated with the meeting can be retrieved. In step 415, the category of the meeting can be determined based on the meeting metadata. In step 420, the user settings associated with the meeting type can be retrieved. In step 425, the user settings can be compared with the occurring meeting. It can be determined if applications should be launched, if application content should be loaded, and/or if other programmatic actions are to be performed. If in step 425, applications should be launched (or other action is to be taken), method 400 can continue to step 440, where the user can optionally be presented with an interface to select which applications to automatically launch. Step 440 can also prompt a user regarding whether the user wants a set of one or more applications to be automatically launched or not. In one embodiment, the optional prompting can be selectively enabled and/or suppressed based upon a confidence level associated with the automated action. Method 400 can complete in step 445, where the selected applications can be automatically launched and/or other indicated programmatic actions can be automatically executed responsive to the meeting driven event.

Monitoring is another aspect of method 400 that can optionally occur to monitor user behavior with and application state changes in context of a meeting event. Step 460 can represent a decision point as to whether monitoring is enabled/disabled for a given computing session/event. If in step 460, the meeting should be monitored, method 400 can progress to step 450, where the meeting is monitored for its duration and historical data can be logged regarding the meeting. This logged data can relate to application states of a set of computing devices and a manner in which they change during a course of a meeting. When consistent patterns emerge for application state a given meeting type, these programmatic actions can be automatically executed in accordance with the patterns based upon occurrence times of the meetings. If in step 460, the computing session is not to be monitored, method 400 can progress to step 455, where the meeting can commence and application state changes can optionally occur with monitoring disabled.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for adjusting application state of a set of computing devices comprising:
   detecting a programmatic event related to a meeting;
   determining a plurality of previous meetings similar to said meeting, wherein each of the previous meetings have an application state for a computing device stored for that at least one previous meeting, wherein application state refers to a desktop state of a user interface of the computing device;
   comparing a quantity of the previous meetings determined to be similar to said meeting against a previously defined quantity threshold;
   when the quantity threshold is not satisfied, taking no further programmatic actions to adjust automatically application state responsive to the meeting; and
   when the quantity threshold is satisfied:
      ascertaining a pattern relating to user interactions on a desktop, open applications, and loaded document all of which are recorded as an application state of a set of at least one computing device for the determined previous meetings;
      determining a difference between a current application state of the set of computing devices and an application state indicated by the ascertained pattern; and
      automatically adjusting the current application state of the set of computing devices to lessen the determined difference, wherein the adjusting comprises automatically instantiating at least one application to be used during the meeting.

2. The method of claim 1, wherein the adjusting of the current application state further comprises:
   automatically instantiating a plurality of different applications to be used during the meeting, said different applications comprising a word processing application, which is automatically loaded with a file relevant to the meeting when instantiated.

3. The method of claim 1, wherein the adjusting of the current application state further comprises:
   automatically instantiating a word processing application;
   loading content into the word processing application, wherein the loaded content is specific to the meeting.

4. The method of claim 1, wherein the adjusting of the current application state further comprises:
   adjusting a setting or application of a computing device to automatically initiate a real-time communication session, wherein the real-time communication session is used by at least two participants during the meeting.

5. The method of claim 1, wherein a similar meeting is a previous occurrence of a meeting, which is a reoccurring meeting, and wherein the similar meeting determined from the previous meetings is a meeting having a common meeting type with said meeting.

6. The method of claim 1, wherein the adjusting of the current application state further comprises:
   automatically closing a previously instantiated application.

7. The method of claim 1, wherein said ascertained pattern is based upon historical application state information stored for each of the previous meetings.

8. The method of claim 1, wherein metadata associated with the meeting and the at least one previous meeting are each associated with a stored calendar entry of a calendaring system, wherein each stored calendar entry comprises metadata for that entry, wherein the determining of whether said meeting is similar to the previous meeting is based upon a comparison of metadata included in the corresponding stored calendar entries.

9. The method of claim 1, further comprising:
   automatically recording user behavior affecting an application state of the set of computing devices;
   correlating this user behavior to at least one meeting specific events;
   recording the user behavior and the associated meeting specific event; and
   utilizing the recorded user behavior and the associated meeting specific event to determine patterns relating to an application state of the set of computing devices in future iterations of said method.

10. The method of claim 1, wherein one of the set of computing devices is a communication device utilized during a course of the meeting to communicate in real-time with at least one other participant of the meeting, wherein the automatically adjusting of the current application state of the one computing device automatically establishes a real-time communication session with the at least one other participant.

11. The method of claim 10, wherein the set of computing devices comprises a plurality of computing devices, one of which is a personal computer another of which is said communication device.

12. A method of interacting with calendaring events comprising:
   maintaining a plurality of calendar entries within a calendaring system within a storage medium;
   associating at least a portion of these calendar entries with an application state of a computing space of a user associated with the calendar entries at a time associated with the calendar entries, wherein application state refers to a desktop state of a user interface of the computing device, wherein an application state records which applications are instantiated at a point in time on the computing device in time and which documents are loaded into those applications;
   detecting an occurrence of a programmatic event temporally related to one of the calendar entries; and
   determining a plurality of previous meetings similar to said meeting, wherein each of the previous meetings have an application state for a computing device stored for that at least one previous meeting, wherein application state refers to a desktop state of a user interface of the computing device;

comparing a quantity of the previous meetings determined to be similar to said meeting against a previously defined quantity threshold;

when the quantity threshold is not satisfied, taking no further programmatic actions to adjust automatically application state responsive to the meeting; and when the quantity threshold is satisfied, automatically performing at least one programmatic action to adjust the computing space, wherein the programmatic actions are driven by the application state associated with the related calendar entry, wherein the adjusting automatically instantiates a plurality of applications including a word processing application, which is automatically loaded with content specific to the calendar entry.

13. The method of claim 12, wherein the automatically performed programmatic action automatically closes a previously instantiated application of the computing space.

14. The method of claim 12, wherein the performed programmatic actions adjust a user interactive environment of the computing space to a state approximately existing when an event associated with the related one of the calendar entries occurred.

15. A computer program product for adjusting application state of a set of computing devices, a computer usable storage medium having computer usable program code embodied therewith, wherein the computer usable storage medium is a non-transitory, physical storage medium, the computer usable program code comprising:

computer usable program code configured to detect a programmatic event related to a meeting;

computer usable program code configured to determine a plurality of previous meetings similar to said meeting, wherein each of the previous meetings have an application state for a computing device stored for that at least one previous meeting, wherein application state refers to a desktop state of a user interface of the computing device;

computer usable program code configured to compare a quantity of the previous meetings determined to be similar to said meeting against a previously defined quantity threshold;

computer usable program code configured to, when the quantity threshold is not satisfied, take no further programmatic actions to adjust automatically application state responsive to the meeting; and computer usable program code configured to, when the quantity threshold is satisfied:

ascertain a pattern relating to user interactions on a desktop, open applications, and loaded document all of which are recorded as an application state of a set of at least one computing device for the determined previous meetings;

determine a difference between a current application state of the set of computing devices and an application state indicated by the ascertained pattern; and automatically adjust the current application state of the set of computing devices to lessen the determined difference, wherein the adjusting comprises automatically instantiating at least one application to be used during the meeting.

16. The computer program product of claim 15, wherein one of said different applications comprising a word processing application, which is automatically loaded with a file relevant to the meeting when instantiated.

17. The computer program product of claim 15, further comprising:

computer usable program code configured to load content into at least one of the plurality of different applications from a file, wherein the loaded content is specific to the meeting.

18. The computer program product of claim 15, further comprising:

computer usable program code configured to adjust a setting or application of a computing device to automatically initiate a real-time communication session, wherein the real-time communication session is used by at least two participants during the meeting.

19. The computer program product of claim 15, wherein said ascertained pattern is based upon historical application state information stored for each of the previous meetings.

* * * * *